United States Patent
Ejiri et al.

(10) Patent No.: US 6,411,350 B2
(45) Date of Patent: *Jun. 25, 2002

(54) METHOD OF MANUFACTURING AN ELECTRODE SUBSTRATE RESISTANT TO WIRE BREAKAGE FOR AN ACTIVE MATRIX DISPLAY DEVICE

(75) Inventors: Tadashi Ejiri, Himeji; Ryuji Tada, Hyogo-ken, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/789,811

(22) Filed: Feb. 22, 2001

Related U.S. Application Data

(63) Continuation of application No. 08/561,971, filed on Nov. 22, 1995, now Pat. No. 6,208,390.

(30) Foreign Application Priority Data

Nov. 24, 1994 (JP) .............................................. 6-289324
Sep. 19, 1995 (JP) .............................................. 7-250275

(51) Int. Cl.$^7$ .......................... G02F 1/136; G02F 1/1345
(52) U.S. Cl. .............................. 349/43; 349/46; 349/51; 349/149
(58) Field of Search ............................... 349/43, 42, 46, 349/51, 149

(56) References Cited

U.S. PATENT DOCUMENTS 6,208,390 B1 * 3/2001 Ejiri et al. ..................... 349/43

* cited by examiner

Primary Examiner—William L. Sikes
Assistant Examiner—Julie Ngo
(74) Attorney, Agent, or Firm—Pillsbury Winthrop LLP

(57) ABSTRACT

A method for manufacturing an electrode substrate includes providing an insulating substrate and forming a first conductive layer on the insulating substrate. The first conductive layer has a narrowed wiring region and forms a first wiring pattern and a second wiring pattern. The narrowed wiring region defines a boundary region disposed between the first wiring pattern and the second wiring pattern. The method also includes forming a second conductive layer in electrical contact with the first conductive layer. The second conductive layer has a narrowed wiring region and forms a third wiring pattern and a fourth wiring pattern. The narrowed wiring region of the second conductive layer defines another boundary region disposed between the third wiring pattern and the second wiring pattern. The first and second conductive layers are formed such that the boundary regions of each of the first and second conductive layers do not overlap each other.

24 Claims, 11 Drawing Sheets

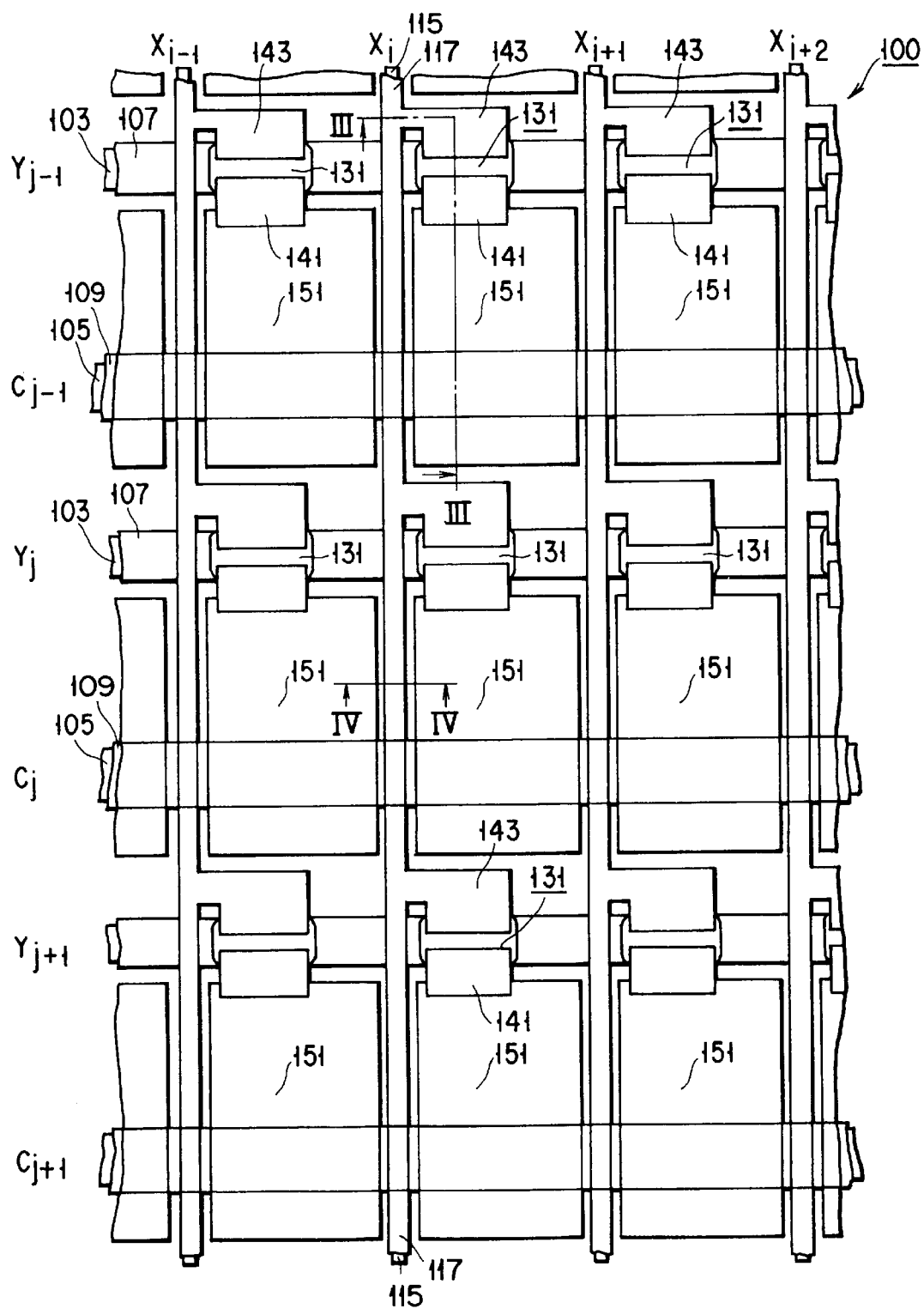
F I G. 2

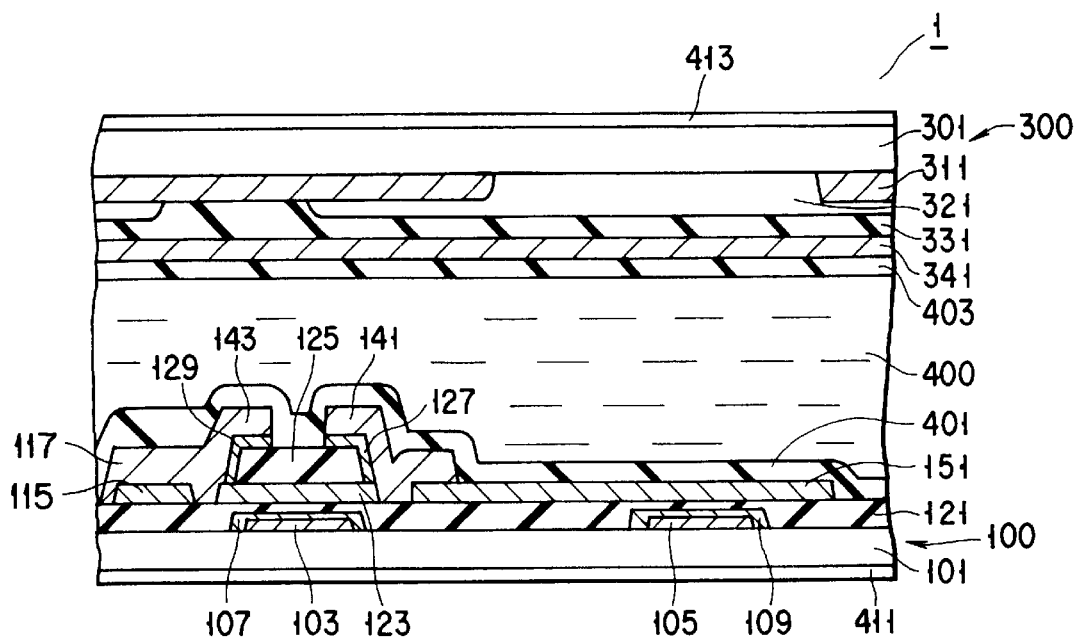
F I G. 3
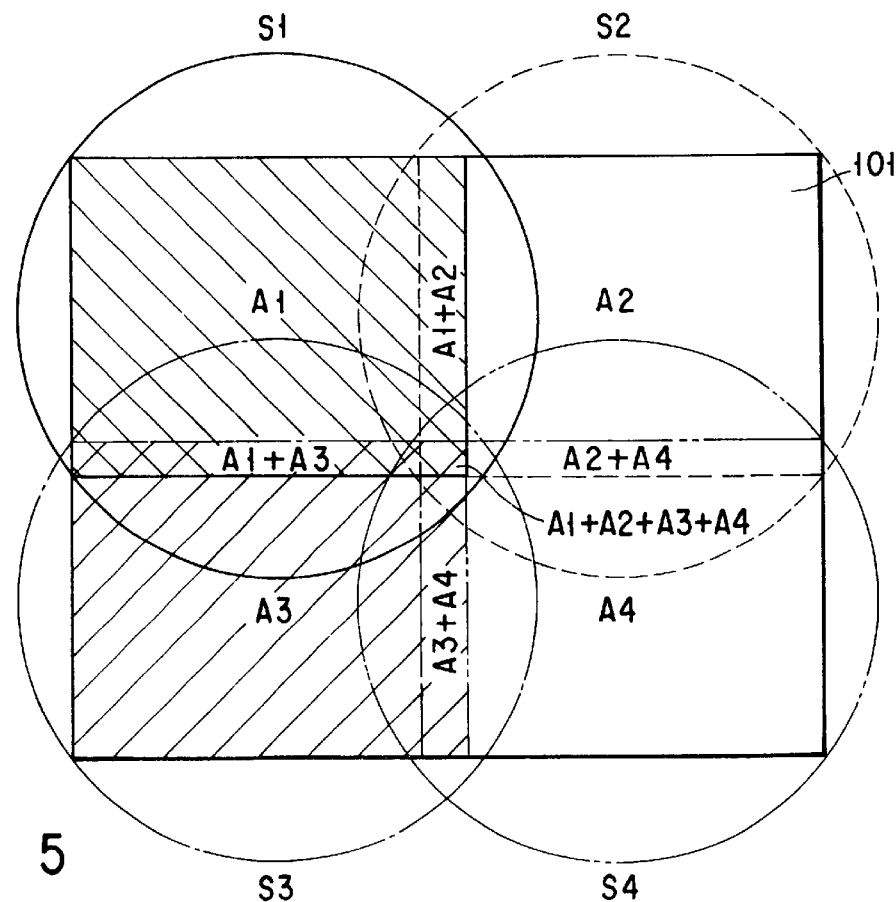
F I G. 5

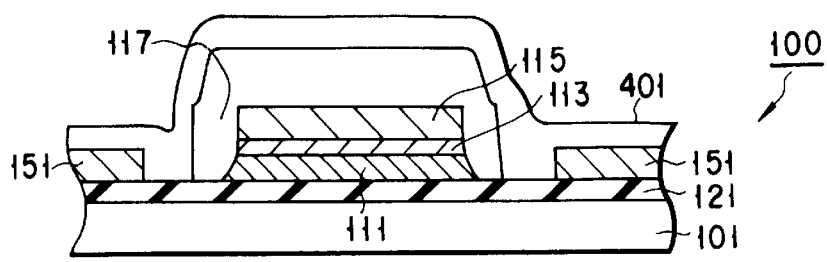
F I G. 4
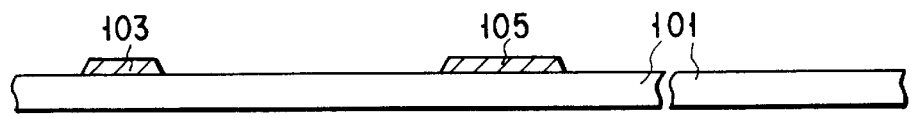
F I G. 6A
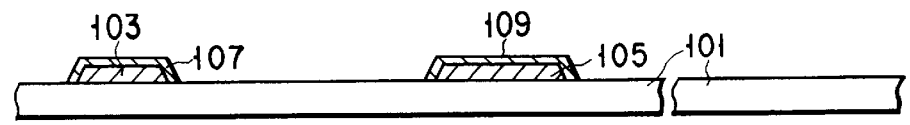
F I G. 6B
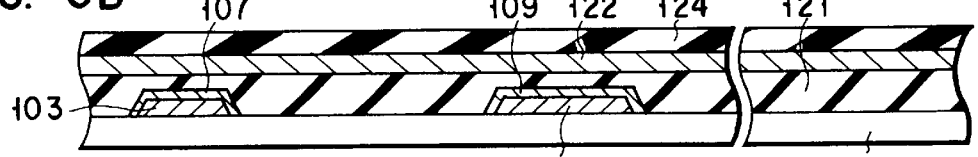
F I G. 6C
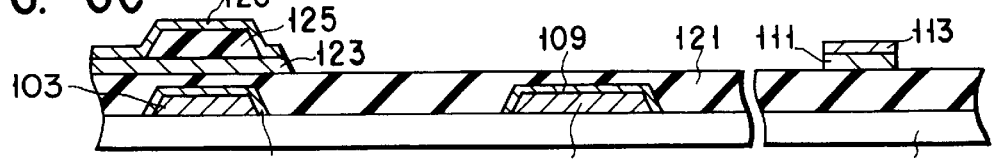
F I G. 6D
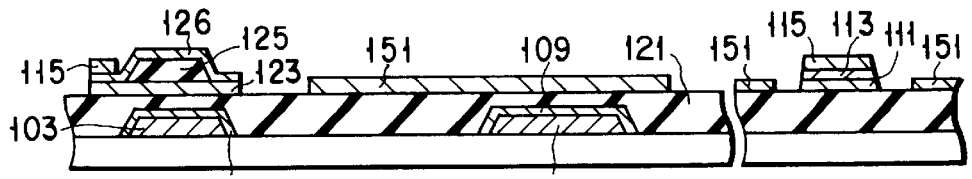
F I G. 6E
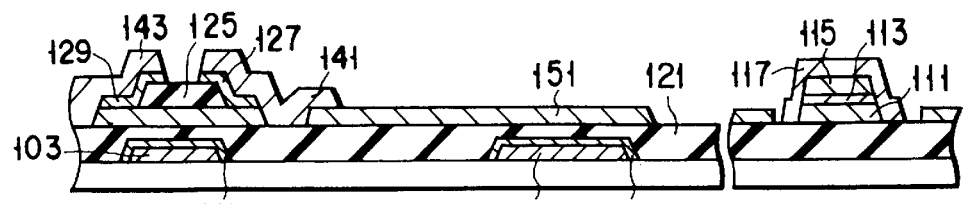
F I G. 6F

METHOD OF MANUFACTURING AN ELECTRODE SUBSTRATE RESISTANT TO WIRE BREAKAGE FOR AN ACTIVE MATRIX DISPLAY DEVICE This a continuation of application Ser. No. 08/561,971, filed Nov. 22, 1995 now U.S. Pat. No. 6,208,390.

BACKGROUND OF THE INVENTION

1. Field of the Invention

The present invention relates to an electrode substrate including a base substrate and electrode wires formed thereon, for example, an array substrate for a display device for use in a liquid crystal display device and a method for manufacturing the same.

2. Description of the Related Art

In recent years, flat panel display devices, represented by a liquid crystal display device, are used in various fields, such as television display devices, computer display devices and display devices for use in car navigation systems, utilizing the characteristics that it is light weight, thin package size, and low power consumption, as compared to display devices such as CRTs.

In particular, active matrix display devices have been researched and developed, since an image can be displayed satisfactorily without cross talk between adjacent pixels. In an active matrix display device, switch elements, such as thin-film-transistors (TFTs) or metal-insulator-metals (MIMs), are respectively provided for display pixels.

Conventional art will be briefly described below, taking, for example, an active matrix liquid crystal display device in which TFTs are used as switch elements of the respective display pixels.

The active matrix liquid crystal display device comprises an array substrate including a plurality of pixel electrodes arranged in a matrix, and a liquid crystal composition, as an optical modulating layer, sealed between the array substrate and a counter substrate on which a counter electrode is formed. The array substrate has a transparent insulating substrate, e.g., a glass substrate, a plurality of TFTs arranged on the substrate, and a plurality of pixel electrodes connected to the TFTs. The array substrate also includes 480 scanning lines connected to the gate electrodes of the TFTs arranged in a row direction, 640×3 signal lines connected to the drain electrodes of the TFTs arranged in a column direction, and 480 storage capacitor lines arranged opposite to the pixel electrodes via an insulating layer so as to form storage capacitors $C_s$.

Recently, as regards the liquid crystal display devices, such as the flat panel display device, there is a demand for a high resolution display image of a large size display region having a diagonal line of, for example, 10 inches or greater. To meet the demand, an array substrate for such a large refined display device is required. However, the array substrate is so large that the overall substrate cannot be exposed at a time in an exposing step in the array substrate manufacturing steps, since the size of the exposure apparatus is restricted. Therefore, it is necessary to expose the overall exposure region of one array substrate in a plurality of segment regions, for example, four regions A1 to A4 as shown in FIG. 1.

The four regions shown in FIG. 1A are: a first region A1 exposed in a first exposing step; a second region A2 exposed in a second exposing step; a third region A3 exposed in a third exposing step; and a fourth region A4 exposed in a fourth exposing step. A double exposure region A1+A2, which is exposed twice, is formed between the first region A1 and the second region A2. The double exposure region is formed, so that an unexposed portion may not be formed between the exposure regions. Similarly, double exposure regions A1+A3, A3+A4 and A2+A4 are formed respectively between the regions A1 and A3, between the regions A3 and A4, and between the regions A2 and A4.

Each of the double exposure regions A1+A2, A1+A3, A3+A4 and A2+A4 are exposed with at least two masks in the aforementioned segment exposure method. Therefore, in the double exposure region, a wiring defect, such as breakage, is liable to occur in the wire pattern in a higher possibility as compared to the other regions.

For example, to form an electrode wire on a glass substrate, an aluminum thin film is deposited on the glass substrate and then patterned into an electrode wire. In this patterning, photoresist is first applied to the aluminum thin film, and after the photoresist is dried, it is selectively exposed using a mask defining a predetermined wire pattern. In the segment exposure method, a plurality of masks are prepared, which have characteristic patterns corresponding to the wires to be formed in the respective exposure regions. FIG. 1B shows a first exposure image RP1 exposed by the first exposing step for forming an electrode wire and a second exposure image RP2 exposed by the second exposing step. The first and second exposure images RP1 and RP2 in FIG. 1B respectively correspond to regions masked by the masks for defining the wire patterns of the respective exposure regions. The photoresist in the regions exposed in the exposing steps is removed by a developing process, thereby exposing a portion of the aluminum thin film. Thereafter, the exposed portion of the aluminum film is removed by an etching process, with the result that only that portion of the aluminum pattern, which corresponds to the wire patterns, remains. Then, the photoresist is removed, thereby forming an electrode wire.

In this case, due to mask alignment accuracy, distortion of the substrate or a difference in accuracy between the masks, a wire width W1 of the first exposure image RP1 and a wire width W2 of the second exposure image RP2 may be different from each other, as shown in FIG. 1B, or the exposure images may be deviated from each other. Accordingly, as shown in FIG. 1C, a wire width $W1_0$ of an electrode wire patterned on the basis of the first exposure image RP1 is different from a wire width $W2_0$ of an electrode wire patterned on the basis of the second exposure image RP2.

Further, the double exposure region A1+A2 exposed in the first and second exposing steps is patterned on the basis of the first and second exposure regions A1 and A2. Therefore, as shown in FIG. 1C, a wire width W3 of an electrode wire may be very small, or a wire defect may be caused due to mask alignment accuracy, distortion of the substrate or a difference in accuracy between the masks. Such a problem may also arise in the other double exposure regions.

SUMMARY OF THE INVENTION

An object of the present invention is to provide an electrode substrate having a structure which does not easily arise a defect, such as a wire breakage, and also a method for manufacturing the electrode substrate. Another object of the present invention is to provide a display device which assures a high manufacturing yield.

According to an aspect of the present invention, there is provided an electrode substrate comprising:

a first conductive layer having a first wire pattern made of a first conductive member, and a second wire pattern made of the same member as the first wire pattern, the first and second wire patterns being formed on one plane; and a second conductive layer having a third wire pattern made of a second conductive member deposited on part of the first wire pattern, and a fourth wire pattern deposited on another part of the first wire pattern on which the third wire pattern is not formed, the second wire pattern, and a boundary region between the first and second wire patterns, the third and fourth wire patterns being formed of the same member.

According to another aspect of the present invention, there is provided an electrode substrate for use in a display device, comprising:

an insulating member having at least one substantially flat surface;

a plurality of pixel electrodes arranged in a matrix on the substantially flat surface of the insulating member;

a first conductive layer, formed on the substantially flat surface of the insulating member, and having a first wire pattern made of a first conductive member, and a second wire pattern made of the same member as the first wire pattern, the first and second wire patterns being formed on one plane; and a second conductive layer having a third wire pattern made of a second conductive member deposited on part of the first wire pattern, and a fourth wire pattern deposited on another part of the first wire pattern on which the third wire pattern is not formed, the second wire pattern, and a boundary region between the first and second wire patterns, the third and fourth wire patterns being formed of the same member.

According to still another aspect of the present invention, there is provided a display device comprising:

an array substrate for use in a display device, comprising: an insulating member having at least one substantially flat surface; a plurality of pixel electrodes arranged in a matrix on the substantially flat surface of the insulating member; a first conductive layer, formed on the substantially flat surface of the insulating member, and having a first wire pattern made of a first conductive member, and a second wire pattern made of the same member as the first wire pattern, the first and second wire patterns being formed on one plane; and a second conductive layer having a third wire pattern made of a second conductive member deposited on part of the first wire pattern, and a fourth wire pattern deposited on another part of the first wire pattern on which the third wire pattern is not formed, the second wire pattern, and a boundary region between the first and second wire patterns, the third and fourth wire patterns being formed of the same member;

a counter substrate having at least one counter electrode arranged opposite to the pixel electrodes of the array substrate; and an optical modulating layer held between the array substrate and the counter substrate.

According to a further aspect of the present invention, there is provided a method for manufacturing an electrode substrate for use in a display device, comprising:

a first step of preparing a substrate having an insulating layer;

a second step of depositing a first conductivity member on the insulating layer;

a third step of dividing the first conductivity member into a plurality of segment regions including an overlap region wherein segment regions overlap each other near a boundary of the segment regions, patterning the respective segment regions based on corresponding reference patterns, and patterning the overlap region based on a corresponding reference pattern, thereby forming a first conductive layer;

a fourth step of depositing a second conductivity member on the insulating layer and the first conductive layer; and a fifth step of dividing the second conductivity member into a plurality of segment regions, which are different from the segment region divided in the third step and include an overlap region wherein segment regions overlap each other near a boundary of the segment regions, patterning the respective segment regions based on corresponding reference patterns, and patterning the overlap region based on a corresponding reference pattern, thereby forming a second conductive layer.

The electrode wires on the electrode substrate of the present invention have the first and second wire patterns, and the third and fourth wire patterns deposited on and electrically connected the first and second wire patterns. In addition, the fourth wire patterns are formed on a boundary region between the first and second wire patterns and the first wire patterns are formed under a boundary region between the third and fourth wire patterns.

Therefore, even if a wiring defect, such as breakage, occurs in the boundary region between the first and second wire patterns or the boundary region between the third and fourth wire patterns, the fourth or first wire pattern functions redundantly, and the electrode wire itself is not cut off.

Further, even if wire breakage occurs simultaneously in the boundary region between the first and second wire patterns and the boundary region between the third and fourth wire patterns, the electrode wire itself is not cut off, since the boundary region between the first and second wire patterns, and the boundary region between the third and fourth wire patterns are located in different regions on one plane.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a plan view showing part of an array substrate for use in an active matrix liquid crystal display device according to an embodiment of the present invention;

FIG. 3 is a cross-sectional view of the liquid crystal display device taken along the line III—III in FIG. 2;

FIG. 4 is a cross-sectional view of the liquid crystal display device taken along the line IV—IV in FIG. 2;

FIG. 5 is a plan view for explaining segment exposure steps for exposing an array substrate for use in the display device according to the embodiment of the present invention;

FIGS. 6A to 6F are cross-sectional views for explaining part of a process for manufacturing the array substrate for use in the display device shown in FIG. 2;

DETAILED DESCRIPTION OF THE PREFERRED EMBODIMENTS

Figure 1A:
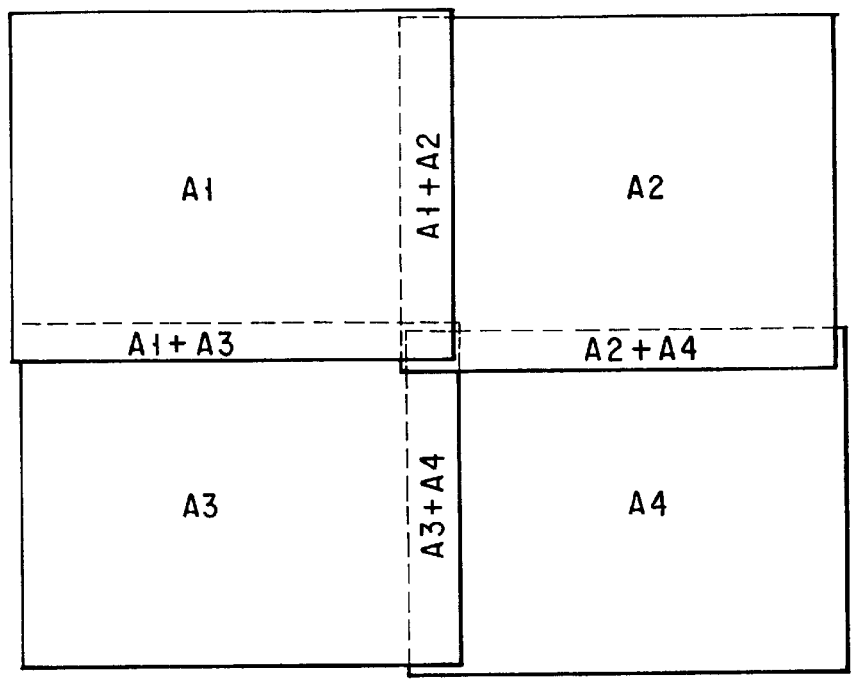
FIG. 1A is a plan view for explaining segment exposing steps for exposing a large-sized substrate.
Figure 1B:
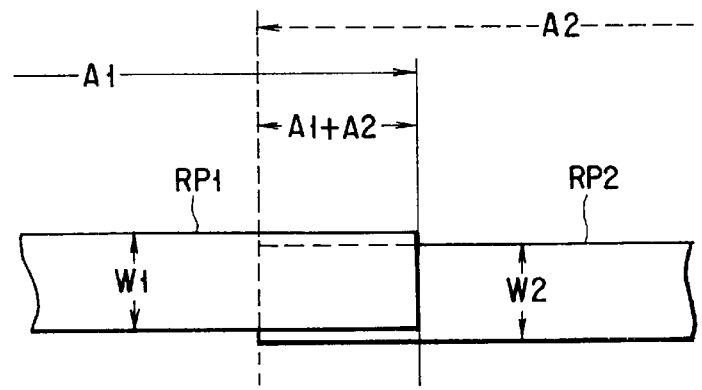
FIG. 1B is a plan view showing an exposed image of an electrode wire formed by segment exposure steps.
Figure 1C:
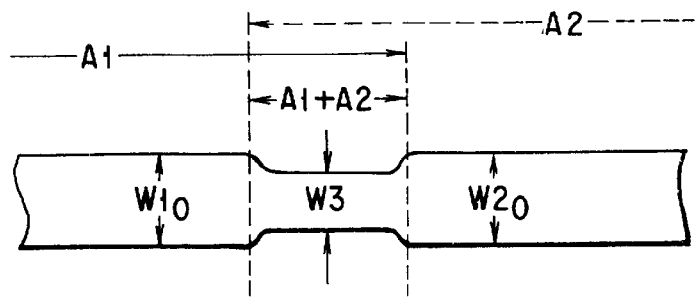
FIG. 1C is a plan view showing a wire pattern formed in accordance with the exposed image shown in FIG. 1B.

An active matrix liquid crystal display device according to an embodiment of the present invention will be described with reference to the accompanying drawings.

FIG. 2 is a plan view showing part of an array substrate for use in an active matrix liquid crystal display device according to an embodiment of the present invention. FIG. 3 is a cross-sectional view of the liquid crystal display device taken along the line III—III in FIG. 2, and FIG. 4 is a cross-sectional view of the liquid crystal display device taken along the line IV—IV in FIG. 2.

As shown in FIG. 2, an array substrate 100 for use in a display device includes (640×3)×480 pieces of pixel electrodes 151 arranged in a matrix on a transparent insulating substrate 101, for example, a glass substrate. 640×3 signal lines $X_i$ (i=1, 2, ... 1920) are formed along the columns of the pixel electrodes 151. 480 scanning lines $Y_j$ (j=1, 2, ... 480) are formed along the rows of the pixel electrodes 151. The array substrate 100 for use in the display device also includes (640×3)×480 pieces of TFTs 131 located in proximity to intersections between the signal lines $X_i$ and the scanning lines $Y_j$. The pixel electrodes 151, formed of ITO (Indium Tin Oxide) film, are respectively electrically connected to the source electrodes 141 of the TFTs 131.

The TFTs 131 are formed on the scanning line $Y_j$ using part of the scanning line $Y_j$ as gate electrodes. Each of the TFTs 131 comprises a semiconductor film 123, a channel protecting layer 125, ohmic contact films 127 and 129, a source electrode 141, and a drain electrode 143. The semiconductor film 123 is formed of, for example, amorphous silicon (a-Si:H) thin film and arranged to face the scanning line $Y_j$ via an insulating film 121, formed of silicon oxide ($SiO_2$) deposited on the scanning line $Y_j$. The channel protecting layer 125 is formed of silicon nitride ($SiN_x$) film and arranged on the semiconductor film 123 in self-alignment with the wire pattern of the scanning line $Y_j$. The ohmic contact films 127 and 129 are formed of, for example, $n^+$-type amorphous silicon ($n^+$a-Si:H) thin film. The source electrode 141 and the drain electrode 143 are formed of a laminated member consisting of molybdenum (Mo) film and aluminum (Al) film. The source electrode 141 electrically connects the semiconductor film 123 with the pixel electrode 151 via the ohmic contact film 127 deposited on the semiconductor film 123. The drain electrode 143 electrically connects the semiconductor film 123 with the signal line $X_i$ via the ohmic contact film 129 deposited on the semiconductor film 123. The drain electrode 143 is part of the signal line $X_i$.

480 storage capacitor lines $C_j$ (j=1, 2, ... , 480) are arranged substantially parallel with the scanning lines $Y_j$ so as to face the pixel electrode 151 via the insulating film 121 formed of silicon oxide ($SiO_2$). An storage capacitor $C_s$ is formed between the pixel electrode 151 and the storage capacitor lines $C_j$.

The scanning line $Y_j$ is formed of the first conductive layer 103 having a wire width of 5 μm and the second conductive layer 107 having a wire width of 9 μm. Similarly, the storage capacitor line $C_j$ is formed of the first conductive layer 105 having a wire width of 10 μm and the second conductive layer 109 having a wire width of 14 μm. The first conductive layer 103 of the scanning line Yj and the first conductive layer 105 of the storage capacitor line Cj are formed by patterning aluminum (Al) deposited on the substrate 101. The second conductive layer 107 of the scanning line Yj and the second conductive layer 109 of the storage capacitor line Cj are formed of molybdenum (Mo)-tantalum (Ta) alloy and deposited on the first conductive layers 103 and 105 so as to cover them in order to prevent corrosion of these layers. Since the first conductive layers 103 and 105 are formed of aluminum (Al), even if the device is large-sized, the resistance of the wiring layers of the device is sufficiently low.

An alloy of molybdenum and a high-melting point metal can be used as the second conductive layers 107 and 109. For example, a molybdenum-tungsten alloy is available as well as the molybdenum-tantalum alloy.

As shown in FIG. 4, the signal line $X_i$ is formed of a first conductive layer 111 having a wire width of 3 μm, a second conductive layer 113 having the same wire width, a third conductive layer 115 having the same wire width and a fourth conductive layer 117 having a wire width of 5 μm. The first conductive layer 111 serving as the signal line is formed is formed of the semiconductor film 123, for example the amorphous silicon (a-Si:H) film. The second conductive layer 113, deposited on the first conductive layer 111, is formed of the ohmic contact film 127, for example, $n^+$-type amorphous silicon ($n^+$a-Si:H) thin film. The third conductive layer 115 is formed by patterning the ITO film deposited on the second conductive layer 113. In the step of patterning the third conductive layer 115, the pixel electrodes 151 are formed simultaneously with the third conductive layer 115, by patterning the ITO film deposited on the insulating film 121. The fourth conductive layer 117, formed of a laminated member consisting of molybdenum (Mo) film and aluminum (Al) film, is deposited so as to cover the first conductive layer 111, the second conductive layer 113 and the third conductive layer 115.

As shown in FIG. 3, a counter substrate 300 has a light shielding film 311, color filters 321, a protecting film 331 and a counter electrode 341, all arranged on a transparent insulating substrate 301, such as a glass substrate. The light shielding film 311 is formed of, for example, black resin or metal, such as chromium (Cr), and arranged in a matrix to cover the TFTs 131, the gaps between the signal lines $X_i$ and the pixel electrodes 151, and the gaps between the scanning lines $Y_j$ and the pixel electrodes 151. The color filters 321 of red (R), green (G) and blue (B) colors are arranged in opening portions of the light shielding film 311. The protecting film 331 is formed on the light shielding film 311 and the color filter 321. The counter electrode 341, made of an ITO film, is formed on the protecting film 331 so as to face the pixel electrodes 151 arranged in a matrix.

A liquid crystal composition 400 of, for example, twisted nematic type, is sealed between the array substrate 100 and the counter substrate 300 via alignment films 401 and 403, respectively. Polarizing plates 411 and 413 are arranged on the outer surfaces of the substrates 100 and 300, respectively, so that the polarization axes thereof are perpendicular to each other.

The display region of a liquid crystal display device 1 of this embodiment, in which an image can be displayed, has a diagonals of 14 inches or longer. For this reason, when the thin films on the array substrate 100 incorporated in the liquid crystal display device 1 are patterned, the overall exposure region on the substrate 100 cannot be exposed at a time with a high degree of accuracy.

To pattern the thin films, the overall exposure region of the transparent insulating substrate 101 is divided into a plurality of segment regions, which are selectively exposed one by one. In this embodiment, to pattern the first conductive layer, for example, as shown in FIG. 5, four segment regions are formed: a first exposure region A1 exposed in a first exposing step; a second exposure region A2 exposed in a second exposing step; a third exposure region A3 exposed in a third exposing step; and a fourth exposure region A4 exposed in a fourth exposing step.

To pattern the second conductive layers, the overall exposure region of the transparent insulating substrate 101 is divided into four segment regions, different from the four segment regions shown in FIG. 5, i.e., a first exposure region A1x, a second exposure region A2x, a third exposure region A3x and a fourth exposure region A4x (which are not shown). These segment regions are selectively exposed one by one. Through these steps, another thin film is formed on the thin film patterned in the former four segment regions A1 to A4.

More specifically, since the exposure regions are exposed through a circular lens, circular regions as shown in FIG. 5 are formed as regions S1, S2, S3 and S4, which can be exposed. To form rectangular exposure region A1 to A4, peripheral portions of the regions Si to S4 are masked. Similarly, although not shown, four rectangular exposure regions A1x, A2x, A3x and A4x, different from the exposure regions A1, A2, A3 and A4, are formed. Masks having wire patterns, corresponding to the first conductive layer, are arranged on the exposure regions A1, A2, A3 and A4, and the exposure regions are exposed one by one, using these masks. More specifically, to pattern the first conductive layer, the first exposure region A1 is exposed in the first exposing step, and sequentially, the second exposure region A2, the third exposure region A3 and the fourth exposure region A4 are selectively exposed. Masks having wire patterns, corresponding to the second conductive layer, are arranged on the exposure regions A1x, A2x, A3x and A4x, and the exposure regions are exposed one by one, using these masks. More specifically, to pattern the second conductive layer, the first exposure region A1x is exposed in another first exposing step, and sequentially, the second exposure region A2x, the third exposure region A3x and the fourth exposure region A4x are selectively exposed.

A double exposure region is formed in a boundary portion between the adjacent exposure regions, so that an unexposed portion may not be formed. A double exposure region A1+A2, which is exposed twice, is formed in a boundary region between the first region A1 and the second region A2. Similarly, double exposure regions A1+A3, A3+A4 and A2+A4 are formed in boundary regions respectively between the regions A1 and A3, between the regions A3 and A4, and between the regions A2 and A4. Further, a multiple exposure region A1+A2+A3+A4 is formed in part of the double exposure regions.

Similarly, although not shown, a double exposure region A1x+A2x, which is exposed twice, is formed in a boundary region between the first region A1x and the second region A2x. Likewise, double exposure regions A1x+A3x, A3x+A4x and A2x+A4x are formed in boundary regions respectively between the regions A1x and A3x, between the regions A3x and A4x, and between the regions A2x and A4x. Further, a multiple exposure region A1x+A2x+A3x+A4x is formed in part of the double exposure regions.

In the double exposure regions A1+A2, A1+A3, A3+A4 and A2+A4, and A1x+A2x, A1x+A3x, A3x+A4x and A2x+A4x, there is a high probability that the wire width is smaller than that in the other regions or a wiring defect, such as breakage, occurs. In this embodiment, the width of all the double exposure region, i.e., the overlap length OLL, is set to 6 μm. It is preferable that the overlap length OLL be as short as possible, so far as an unexposed portion is not formed, and shorter than a side length of the adjacent pixel electrode. It is also preferable that the double exposure region is set in a portion which does not cover the TFTs.

A method for manufacturing the array substrate 100 for use in a liquid crystal display device will now be described with reference to FIGS. 6A to 6F and 7 to 10.

First, as shown in FIG. 6A, an aluminum (Al) film is deposited by sputtering on the transparent insulating substrate 101, i.e., the glass substrate. The aluminum film is patterned to simultaneously form first conductive layers 103, serving as the 480 scanning lines, and first conductive layers 105, serving as the 480 storage capacitor lines. The first conductive layers 103 and 105 made of the aluminum film are patterned through the following steps.

Figure 7:
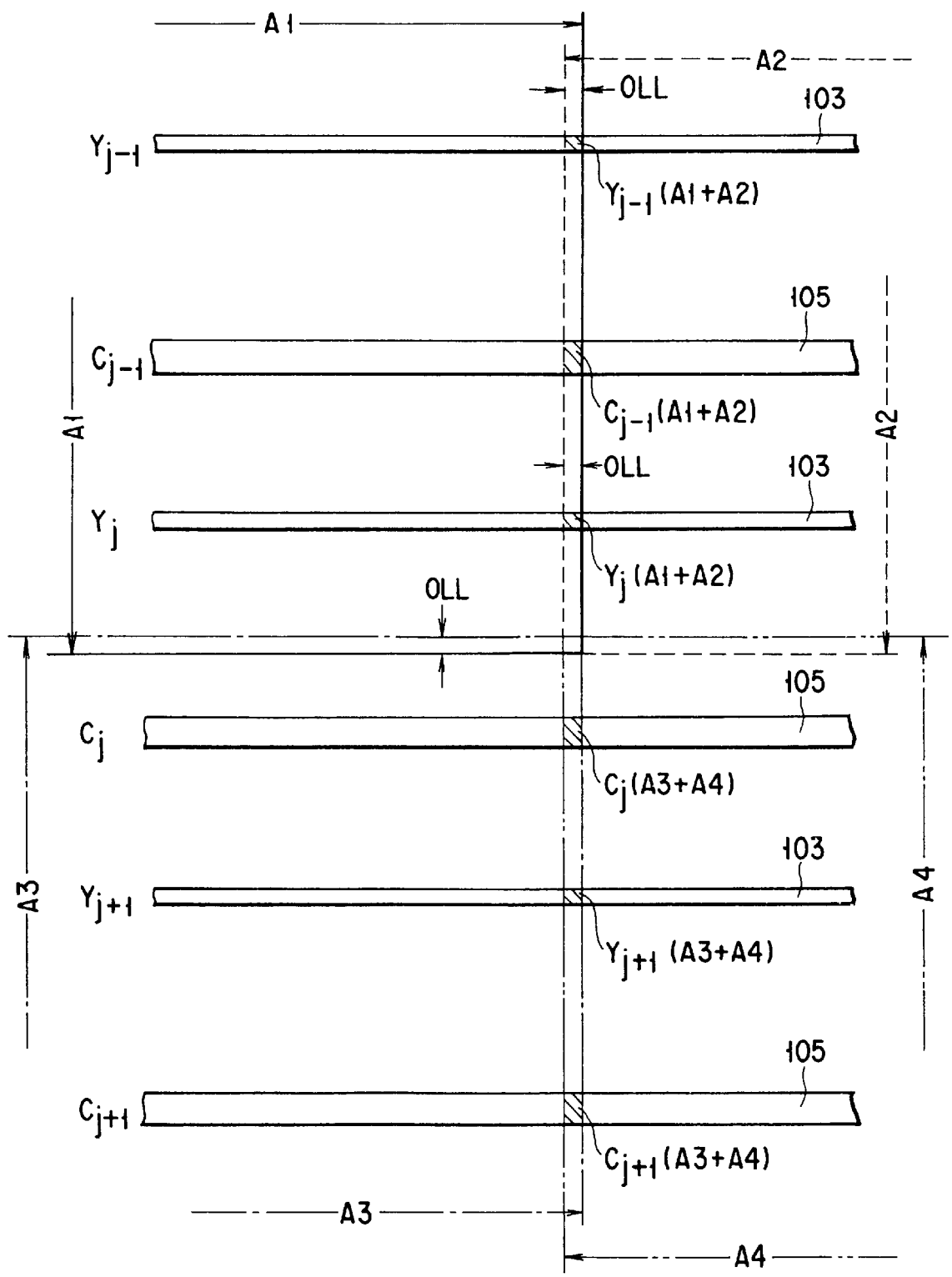
FIG. 7 is a plan view for explaining part of a first segment exposing step for patterning a first conductive layer contained in a scanning line and an storage capacitor line in the liquid crystal display device shown in FIG. 3.

After the aluminum film has been deposited on the transparent insulating substrate 101, photoresist is applied on the aluminum film and dried. The photoresist is selectively exposed in the four exposure regions A1, A2, A3 and A4 as shown in FIG. 7, one by one through the first to fourth exposing steps. At this time, masks for defining wire patterns of the first conductive layers 103 and 105 are arranged on the photoresist. The exposure regions are exposed using the masks. Subsequently, the photoresist is developed, so as to remain only that portion of the photoresist which corresponds to the wire patterns. Then, the aluminum film in the portion, in which the photoresist has been removed, is removed by etching. Thereafter, the remaining photoresist is removed, thereby forming the first conductive layers 103 having the wire width of 5 μm, serving as the scanning lines, and the first conductive layers 105 having the wire width of 10 μm, serving as the storage capacitor lines.

A multiple exposure region, which is exposed twice or more, is formed in a boundary region between the adjacent exposure regions exposed in the first to fourth exposing steps. More specifically, the regions A1 and A2 include the double exposure region A1+A2 which is exposed twice. Likewise, the regions A1 and A3 include the double exposure region A1+A3, the regions A3 and A4 include the double exposure region A3+A4 and the regions A2 and A4 have the double exposure region A2+A4. Further, a multiple exposure region A1+A2+A3+A4 is included in the double exposure regions. The overlap length OLL of the double exposure regions A1+A2, A1+A3, A3+A4 and A2+A4 is set to 6 μm. The double exposure regions A1+A3 and A2+A4 are set between the adjacent first conductive layers 103, and more specifically, between the adjacent first conductive layers 103 and 105. The overlap length OLL of the double exposure regions A1+A2, A1+A3, A3+A4 and A2+A4 can be set in accordance with the mask alignment accuracy; however, it is preferable to set OLL to 10 μm or shorter.

In the first conductive layers 103 and 105, the wire width may be narrower or wire breakage may occur, in regions Y (A1+A2), Y (A3+A4), C (A1+A2) and C (A3+A4) corresponding to the double exposure regions A1+A2 and A3+A4, due to, for example, low mask accuracy, deviation in mask alignment or distortion of the substrate 101. Assume that breakage occurs in the region $Y_j$ (A1+A2).

Thereafter, molybdenum (Mo)-tantalum (Ta) alloy film is deposited on the transparent insulating substrate 101 including the first conductive layers 103 and 105. The alloy film is then patterned. In the patterning step, as shown in FIG. 6B, second conductive layers 107, serving as scanning lines, and second conductive layers 109, serving as storage capacitor lines are simultaneously formed. The second conductive layers 107 and 109 cover the first conductive layers 103 and 105 respectively. The second conductive layer 107 has the wire width of 9 μm and the second conductive layer 109 has the wire width of 14 μm.

Figure 8:
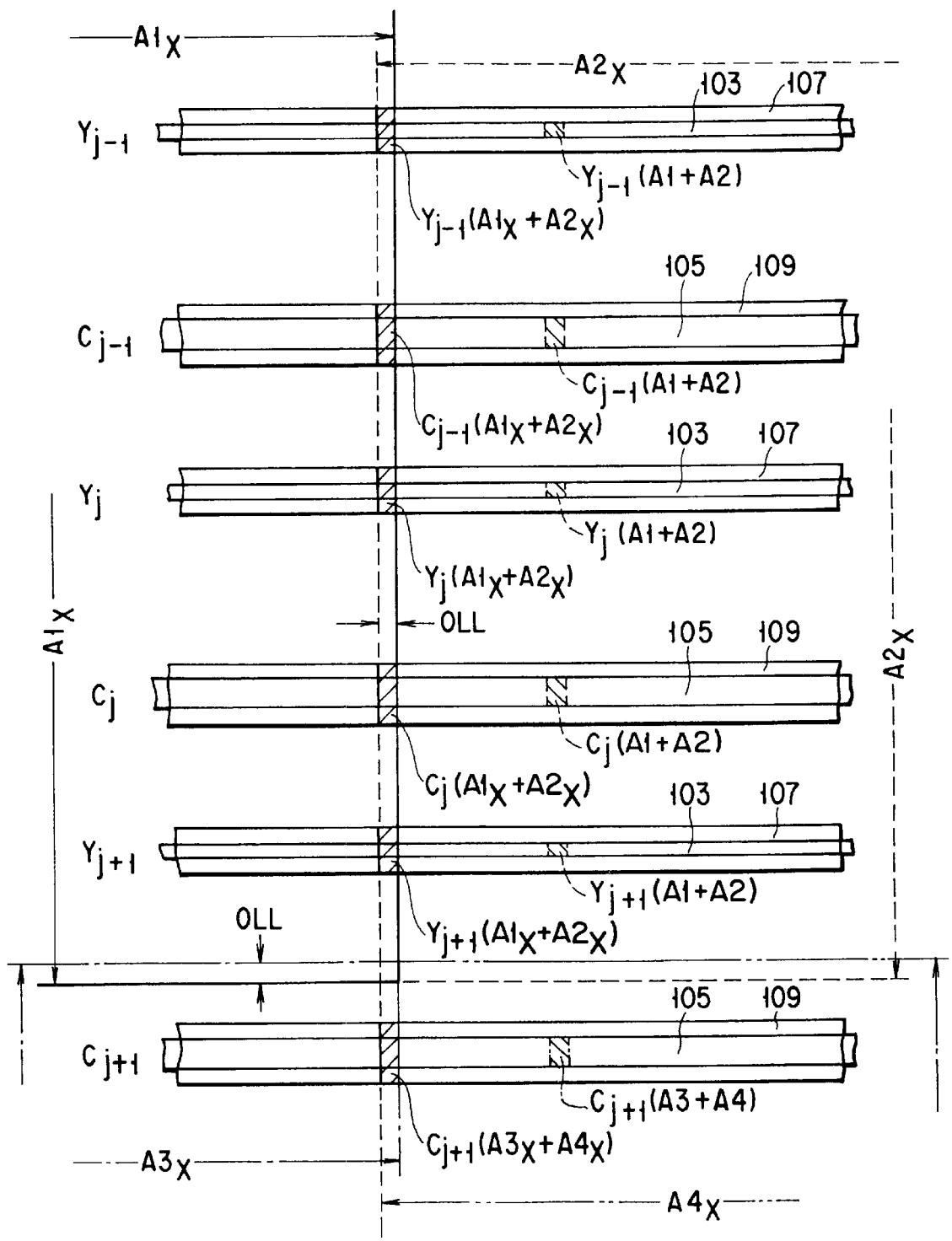
FIG. 8 is a plan view for explaining part of a second segment exposing step for patterning a second conductive layer on the first conductive layer shown in FIG. 7.

The aforementioned Mo—Ta alloy film are patterned into the second conductive layers 107 and 109 in the following steps. After the molybdenum (Mo)-tantalum (Ta) alloy film is deposited on the transparent insulating substrate 101 including the first conductive layers 103 and 105, photoresist is applied on the alloy film and then dried. Then, the photoresist is selectively exposed in the four exposure regions A1x, A2x, A3x and A4x as shown in FIG. 8, one by one. At this time, masks for defining wire patterns of the second conductive layers 107 and 109 are arranged on the photoresist. The exposure regions are exposed using the masks. Subsequently, the photoresist is developed, so as to remain only that portion of the photoresist which corresponds to the wire patterns. Then, the Mo—Ta alloy film in that portion, in which the photoresist has been removed, is removed by etching. The remaining photoresist is removed, thereby forming the second conductive layers 107 and 109. Through these steps, the 480 scanning lines $Y_j$ and storage capacitor lines $C_j$ are formed.

As shown in FIG. 8, the exposure regions A1x, A2x, A3x and A4x used in patterning of the second conductive layers are different from the exposure regions A1, A2, A3 and A4 used in patterning of the first conductive layers. Accordingly, the double exposure regions in the first conductive layers are also different from the double exposure regions in the second conductive layers. The double exposure regions A1x+A3x and A2x+A4x are set between the adjacent second conductive layers 107, and more specifically between the second conductive layer 107 serving as the scanning line and the second conductive layer 109, serving as the storage capacitor line.

In the second conductive layers 107 and 109, the wire width may be narrower or wire breakage may occur, in regions Y (A1x+A2x), Y (A3x+A4x), C (A1x+A2x) and C (A3x+A4x) corresponding to the double exposure regions A1x+A2x and A3x+A4x, due to, for example, low mask accuracy, deviation in mask alignment or distortion of the substrate 101.

Assume that breakage occurs in the region $Y_j$. (A1x+A2x) of the second conductive layer 107 serving as the scanning line.

In this embodiment, the double exposure regions A1+A2 and A3+A4 of the first conductive layers 103 and 105 are formed in different positions in the same plane from that of the double exposure regions A1x+A2x and A3x+A4x of the second conductive layers 107 and 109. In other words, the second conductive layers 107 and 109 are formed on the first conductive layers 103 and 105 corresponding to the double exposure regions Y (A1+A2), Y (A3+A4), C (A1+A2) and C (A3+A4) respectively, and the first conductive layers 103 and 105 are formed under the second conductive layers 107 and 109 corresponding to the double exposure regions Y (A1x+A2x), Y (A3x+A4x), C (A1x+A2x) and C (A3x+A4x) respectively.

For this reason, even if wire breakage occurs in the region $Y_j$ (A1+A2) corresponding to the double exposure region A1+A2 of the first conductive layer 103 of the scanning line $Y_j$, the second conducive layer 107 of the scanning line $Y_j$ functions redundantly, thereby electrically connecting to the wire breakage $Y_j$ (A1+A2), and preventing breakage of the scanning line $Y_j$.

Similarly, even if wire breakage occurs in the region $Y_j$ (A1x+A2x) corresponding to the double exposure region A1x+A2x of the second conductive layers 107 of the scanning line Yj, the first conductive layers 103 of the scanning line Yj functions redundantly, thereby electrically connecting to the wire breakage $Y_j$ (A1x+A2x) and preventing breakage of the scanning line $Y_j$.

Then, as shown in FIG. 6C, a silicon oxide film ($SiO_2$), i.e., an insulating film 121, an amorphous silicon (a-Si:H) thin film 122 and a silicon nitride ($SiN_x$) film 124 are sequentially formed on the insulating substrate 101 on which the scanning lines 103 and 107 and the storage capacitor lines 105 and 109 are formed. Thereafter, the silicon nitride (SiNx) film 124 is self-aligned with the scanning line $Y_j$ and patterned so as to correspond to the wire pattern of the scanning line $Y_j$. More specifically, after the photoresist is applied on the silicon nitride film 124 and then dried, the photoresist is exposed through the rear surface of the glass substrate 101. In this time, since the scanning line Yj functions as a mask, the photoresist is exposed so as to correspond to the wire pattern of the scanning line $Y_j$. The photoresist is developed, and then the silicon nitride (SiNx) film 124 is etched. The remaining photoresist is removed, thereby forming the silicon nitride (SiNx) film 124 self-aligned with the scanning line $Y_j$, i.e., a channel protecting film 125.

Subsequently, an n$^+$-type amorphous silicon (n$^+$a-Si:H) thin film is formed on an amorphous silicon (a-Si:H) thin film 122 and the channel protecting film 125. Thereafter, the amorphous silicon (a-Si:H) thin film 122 and the n$^+$-type amorphous silicon (n$^+$a-Si:H) thin film are patterned into an island shape including the amorphous silicon (a-Si:H) thin film, i.e., the semiconductor film 123, and the n$^+$-type amorphous silicon (n$^+$a-Si:H) thin film 126, as shown in FIG. 6D. In the patterning step, the amorphous silicon (a-si:H) thin film 122 deposited on the region, in which the signal line Xi is to be formed, and the n$^+$-type amorphous silicon (n$^+$a-Si:H) thin film 126 are patterned, thereby forming the first conductive layer 111 serving as a signal line and the second conductive layer 113, both having a wire width of 3 µm.

The patterning of the amorphous silicon (a-Si:H) thin film 122 and the n$^+$-type amorphous silicon (n$^+$ a-Si:H) thin film 126 is performed in the four regions A1, A2, A3 and A4 shown in FIG. 7.

Thereafter, an ITO film is deposited on the insulating film 121 and the n$^+$-type amorphous silicon (n$^+$a-Si:H) thin film 126 and patterned, thereby simultaneously forming pixel electrodes 151 and the third conductive layers 115 serving as signal lines. The pixel electrodes 151 are formed on the insulating film 121 and the third conductive layer 115 are formed on the n$^+$-type amorphous silicon (n$^+$a-Si:H) thin film 126 corresponding to the second conductive layer 113, so as to have substantially the same wire width as that of the second conductive layer 113. The ITO film is patterned in the following steps.

Figure 9:
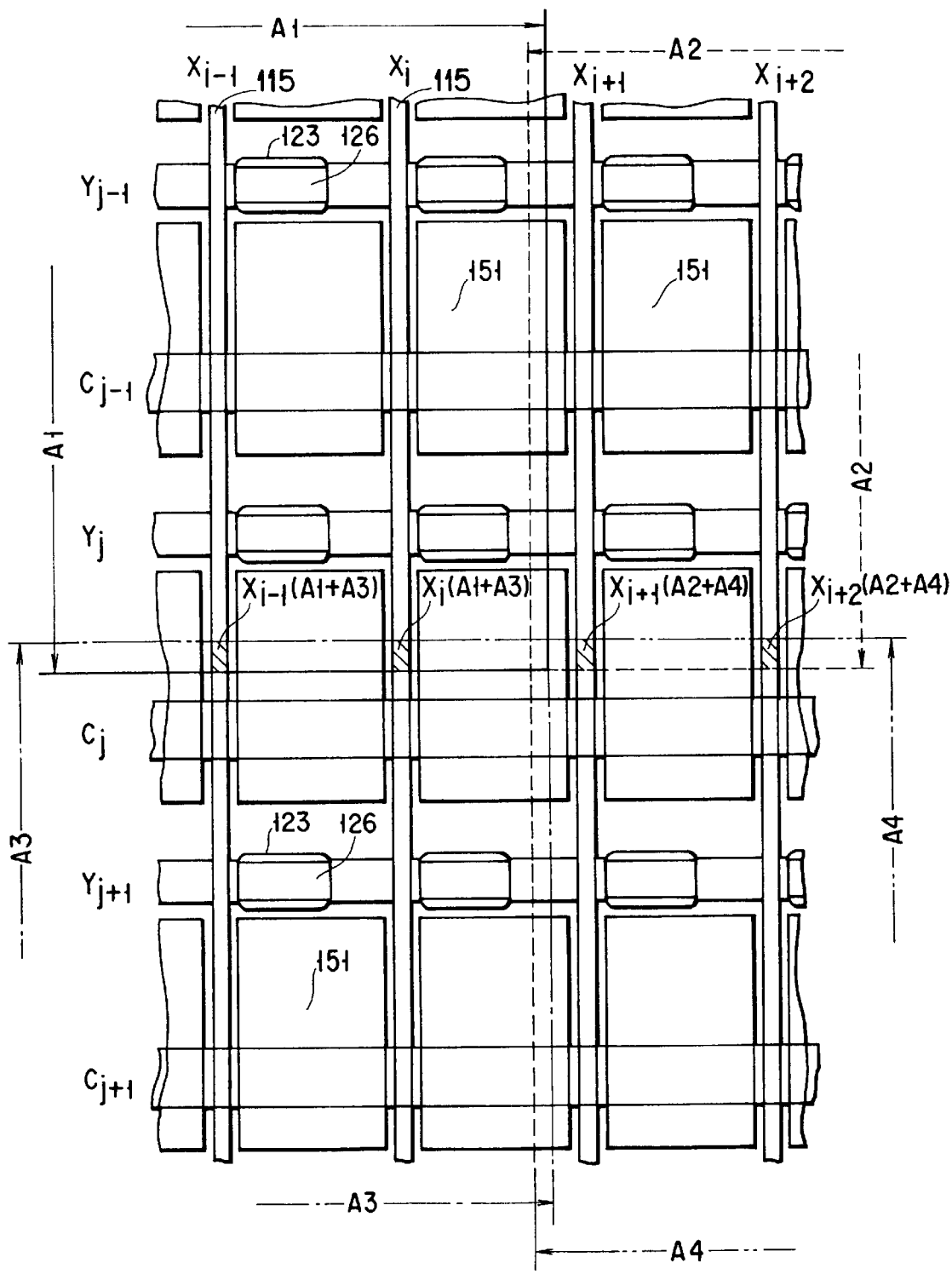
FIG. 9 is a plan view for explaining part of a first segment exposing step for patterning a first conductive layer and a pixel electrode contained in a signal line in the liquid crystal display device shown in FIG. 4.

After the ITO film is deposited, photoresist is applied on the ITO film and then dried. Then, the photoresist is selectively exposed in the four exposure regions A1, A2, A3 and A4 as shown in FIG. 9, one by one, using masks for defining wire patterns, in the same manner as shown in FIG. 7. Subsequently, the photoresist is developed. Then, the ITO film in that portion, in which the photoresist has been removed, is removed by etching. Further, the remaining photoresist is removed, thereby forming the pixel electrodes 151 and the third conductive layers 115 as shown in FIGS. 6E and 9.

In the first to fourth exposing steps for exposing the four regions A1 to A4 in FIG. 9, the regions A1 and A2 include the double exposure region A1+A2 which is exposed twice. Likewise, the regions A1 and A3 include the double exposure region A1+A3, the regions A3 and A4 include the double exposure region A3+A4 and the regions A2 and A4 include the double exposure region A2+A4. The overlap length OLL of each of the double exposure regions A1+A2, A1+A3, A3+A4 and A2+A4 is set to 6 µm. The double exposure regions A1+A2 and A3+A4 are set between the adjacent first conductive layers 111 so as not to cover the TFTs 131. The double exposure regions A1+A3 and A2+A4 are set between the adjacent scanning lines Y$_j$ so as not to cover the TFTs 131. As described before, the overlap length OLL of the double exposure regions A1+A2, A1+A3, A3+A4 and A2+A4 can be set in accordance with the mask alignment accuracy; however, it is preferable to set OLL to 10 µm or shorter.

In this embodiment, the double exposure region of the first conductive layer 111 serving as a signal line and the second conductive layer 113 is located at substantially the same position as the double exposure region of the third conductive layer 115. However, to improve the redundancy, it is preferable that the double exposure regions are located at different positions on the same plane.

In the first, second and third conductive layers 111, 113 and 115 thus formed, the wire width may be narrower or wire breakage may occur, in regions X (A1+A3) and X (A2+A4) corresponding to the double exposure regions A1+A3 and A2+A4, due to, for example, low mask accuracy, deviation in mask alignment or distortion of the substrate 101. Assume that breakage occurs in the region X$_i$ (A1+A3).

Figure 10:
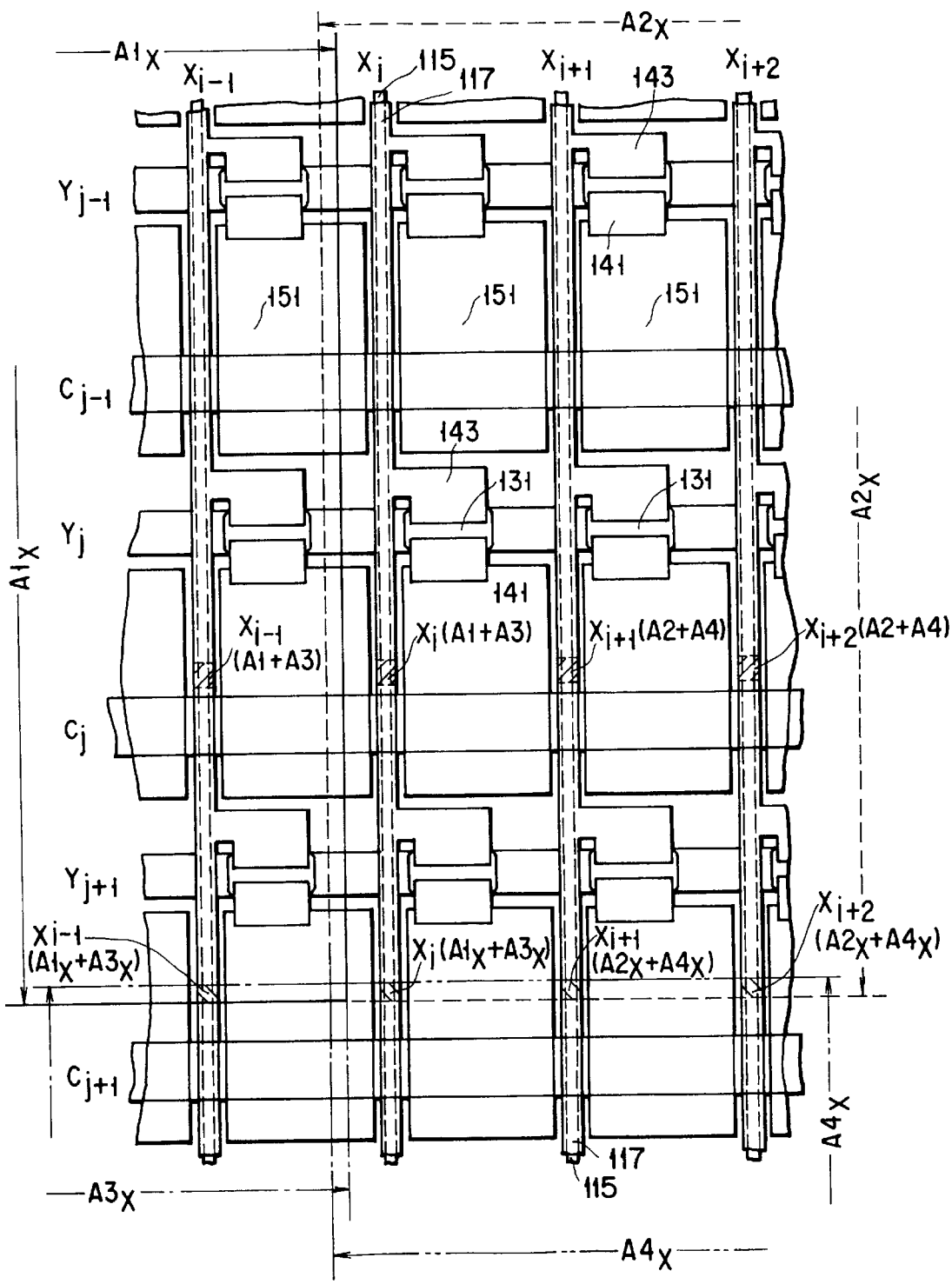
FIG. 10 is a plan view for explaining part of a second segment exposing step for patterning a second conducive layer on the first conductive layer shown in FIG. 9.

Then, molybdenum (Mo) film and aluminum (Al) film are sequentially deposited by sputtering and then patterned. The patterning step is performed with respect to four regions A1$x$, A2$x$, A3$x$ and A4$x$ as shown in FIG. 10. Through the patterning step, as shown in FIG. 6F, the drain electrode 143 is formed integral with the fourth conductive layers 117 (serving as signal lines) made of a laminated member of the molybdenum film and the aluminum film. At the same time, source electrodes 141 are formed of the laminated member of the molybdenum film and the aluminum film, and electrically connected to the pixel electrodes 151.

In the patterning step, the n$^+$-type amorphous silicon (n$^+$a-Si:H) thin film 126 and the laminated member are patterned, thereby forming the ohmic contact layer 129, interposed between the drain electrode 143 and the semiconductor film 123, and the ohmic contact layer 127, interposed between the source electrode 141 and the semiconductor film 123.

As shown in FIG. 10, the exposure regions A1$x$, A2$x$, A3$x$ and A4$x$, used in patterning the laminated member of the molybdenum film and the aluminum film, and the island n$^+$-type amorphous silicon (n$^+$a-Si:H) thin film 126, have different double exposure regions from those of the exposure regions A1, A2, A3 and A4 used in patterning the ITO film. The double exposure regions A1$x$+A2$x$ and A3$x$+A4$x$ are set between the adjacent fourth conductive layers 117 so as not to cover the TFTs 131. The double exposure regions A1$x$+A3$x$ and A2$x$+A4$x$ are set between the adjacent scanning lines Y$_j$ so as not to cover the TFTs 131.

In the fourth conductive layer 117 made of the laminated member of the molybdenum film and the aluminum film, the wire width may be narrower or wire breakage may occur, in regions x (A1$x$+A3$x$) and X (A2$x$+A4$x$) corresponding to the double exposure regions A1$x$+A3$x$ and A2$x$+A4$x$, due to, for example, low mask accuracy, deviation in mask alignment or distortion of the substrate 101.

Assume that breakage occurs in the region X$_i$ (A2$x$+A4$x$) of the fourth conductive layer 117 serving as the signal line.

In this embodiment, the double exposure regions A1+A3 and A2+A4 of the first, second and third conductive layers 111, 113 and 115 are formed in different position in the same plane from that of the double exposure regions A1$x$+A3$x$ and A2$x$+A4$x$ of the fourth conductive layers 117. In other words, the fourth conductive layers 117 are formed on the double exposure regions X (A1+A3) and X (A2+A4) of the first, second and third conductive layers 111, 113 and 115, while the first, second and third conductive layers 111, 113 and 115 are formed under the double exposure regions X (A1$x$+A3$x$) and X (A2$x$+A4$x$) of the fourth conductive layers 117.

For this reason, even if wire breakage occurs in the double exposure region, e.g., Xi (A1+A3), of the first, second and third conductive layers 111, 113 and 115 of the signal line X$_i$, the fourth conductive layer 117 of the signal line X$_i$ functions redundantly, thereby electrically connecting to the wire breakage X$_i$ (A1+A3), and preventing breakage of the signal line X$_i$. Similarly, even if wire breakage occurs in the double exposure region, e.g., Xi (A2$x$+A4$x$), of the fourth conductive layer 117 of the signal line $X_i$, the first, second and third conductive layers 111, 113 and 115 of the signal line $X_i$ functions redundantly, thereby electrically connecting to the wire breakage $X_i$ (A2x+A4x), and preventing breakage of the signal line $x_i$.

After the wire patterns of the TFTs 131 and the pixel electrodes 151 are formed on the array substrate 100 of the display device through the steps as shown in FIGS. 6A to 6F, an alignment film 401 is formed on the over all surface of the array substrate 100.

Further, a polarizing plate 411 of a predetermined polarizing direction is arranged on the rear surface of the glass substrate 100, i.e., the surface on which the TFTs and the other elements are not formed.

The array substrate 100 for use in the liquid crystal display is formed through the aforementioned steps.

As described above, with the array substrate 100 for use in the display device of this embodiment, defects, such as breakage of the signal lines $X_i$ or the scanning lines $Y_j$ in the segment exposure, are greatly reduced, thereby improving the manufacturing yield. In particular, even if the wire widths of the signal lines $X_i$ and the scanning lines $Y_j$ are as small as 5 μm and 9 μm, respectively, breakage of the wires can be considerably reduced. It is therefore possible to provide a device of a high reliability by incorporating the above array substrate 100 in the liquid crystal display device.

In the above embodiment, the signal line $X_i$ has a laminated structure consisting of the first conductive layer 111 made of the amorphous silicon (a-Si:H) film, the second conductive layer 113 made of the n$^+$-type amorphous silicon (n$^+$a-Si:H) thin film, the third conductive layer 115 formed of the ITO film, and the fourth conductive layer 117 made of the laminated member of molybdenum and aluminum. However, since the first and second conductive layers 111 and 113 are formed simultaneously with the forming of the TFTs 141 and the third conductive layer 115 is formed simultaneously with the patterning of the pixel electrodes 151, the number of manufacturing steps is relatively less as compared to the conventional art.

In the above embodiment, the double exposure regions A1+A2 and A1x+A2x are arranged with a signal line $X_i$ interposed therebetween so as not to overlap with each other, and the double exposure regions A3+A4 and A3x+A4x are also arranged in the same manner. However, the double exposure regions can be arranged with no signal line $X_i$ interposed therebetween, so long as they do not overlap with each other. Likewise, the double exposure regions A1+A3 and A1x+A3x are arranged with a scanning line $Y_j$ interposed therebetween so as not to overlap with each other, and the double exposure regions A2+A4 and A2x+A4x are also arranged in the same manner. However, the double exposure regions can be arranged with no scanning line $Y_j$ interposed therebetween, so long as they do not overlap with each other. Nevertheless, it is preferable that the double exposure regions be arranged with a signal line $X_l$ or a scanning line $Y_l$ interposed therebetween, in which case the boundary between the exposure regions is not easily recognized visually. When the array substrate thus formed is incorporated in the liquid crystal display device, the boundary between the exposure regions cannot be easily recognized on the display screen.

Further, in the above embodiment, since the exposure regions A1 to A4 and A1x to A4x are rectangular, the boundary between the adjacent exposure regions is linear. A region formed on the basis of the exposure regions A1 and A1x is different from a region formed on the basis of the exposure regions A2 and A2x in the TFT characteristics and the parasitic capacitance which influences the pixel electrodes, due to the mask accuracy, the distortion of the substrate, or the like. Hence, the display states in the regions are somewhat different and the boundary between the exposure regions may be visually recognized.

Figure 11:
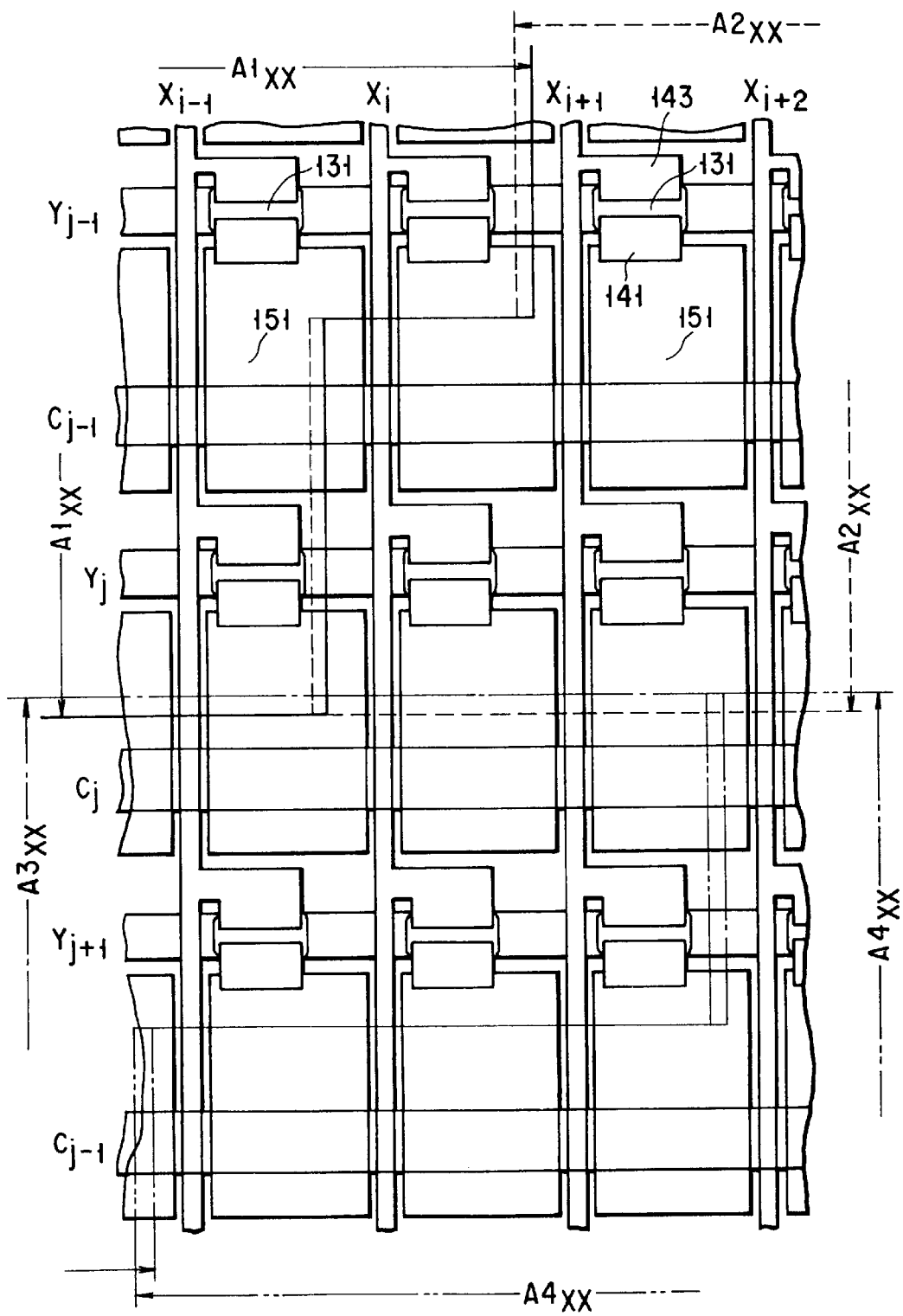
FIG. 11 is a plan view for explaining part of another segment exposing step in the process for manufacturing the array substrate for use in the display device shown in FIG. 2.

To avoid this problem, the exposure regions A1 to A4 and A1x to A4x may have the shapes as shown in FIG. 11, which are not rectangular as described above, so that the boundary between the exposure regions can be non-linear. In this case, the boundary is not easily recognized visually. In the above structure, a boundary region between the exposure regions includes a display pixel corresponding to the exposure regions A1 and A1x, a display pixel corresponding to the exposure regions A2 and A2x, a display pixel corresponding to the exposure region A1 and A2x, and a display pixel corresponding to the exposure regions A2 and A1x. The boundary region therefore assumes a display status between the status of the display pixel corresponding to the exposure regions A1 and A1x and the display pixel corresponding to the exposure regions A2 and A2x. Thus, the boundary cannot be easily recognized.

An active matrix liquid crystal display device according to another embodiment of the present invention will now be described with reference to the drawings.

Figure 12:
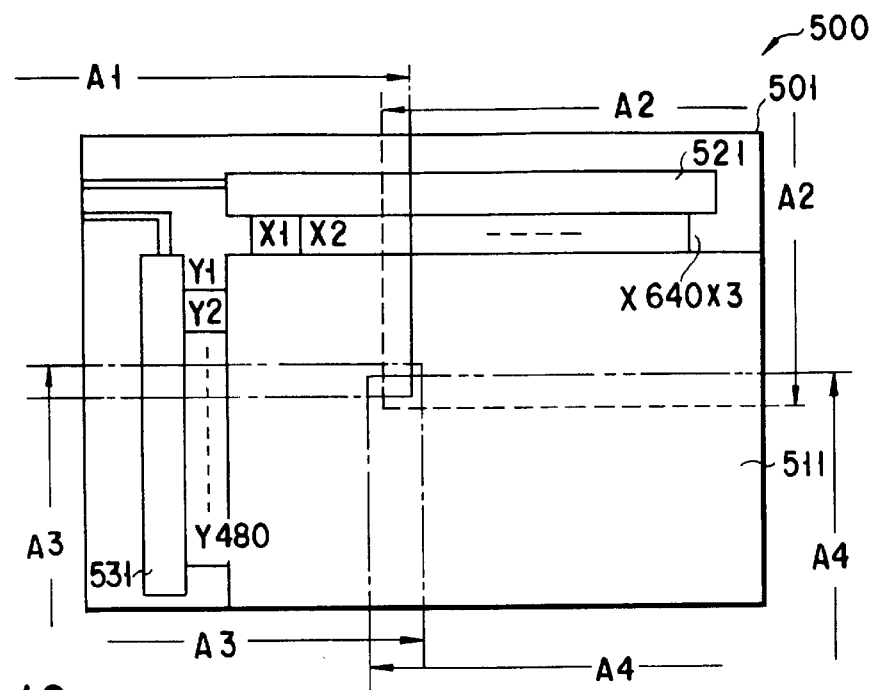
FIG. 12 is a plan view showing part of an array substrate for use in an active matrix liquid crystal display device according to another embodiment of the present invention.

In this embodiment, as shown in FIG. 12, an array substrate 500 for a display device has a transparent insulating substrate 501, made of, for example, glass and 640×3 signal lines $X_i$ (i=1, 2, ..., 1920) and 480 scanning lines $Y_j$ (j=1, 2, ..., 480), like the embodiment which has been described above. The array substrate 500 for a display device also comprises a plurality of pixel electrodes 671 formed of ITO and arranged on a matrix on the transparent insulating substrate 501. The signal lines $X_i$ are arranged along the columns of the pixel electrodes 671 and the scanning lines $Y_j$ are arranged along the rows of the pixel electrodes 671. Each signal line $X_i$ and each scanning line $Y_j$ are arranged on the transparent insulating substrate 501 so as to be approximately perpendicular to each other. The array substrate 500 for a display device further includes a display pixel region 511, in which TFTs 621 are arranged near intersections of the signal lines $X_i$ and the scanning lines $Y_j$. Source electrodes 681 of the TFTs 621 are electrically connected to the pixel electrodes 671, as shown in FIG. 13.

Figure 13:
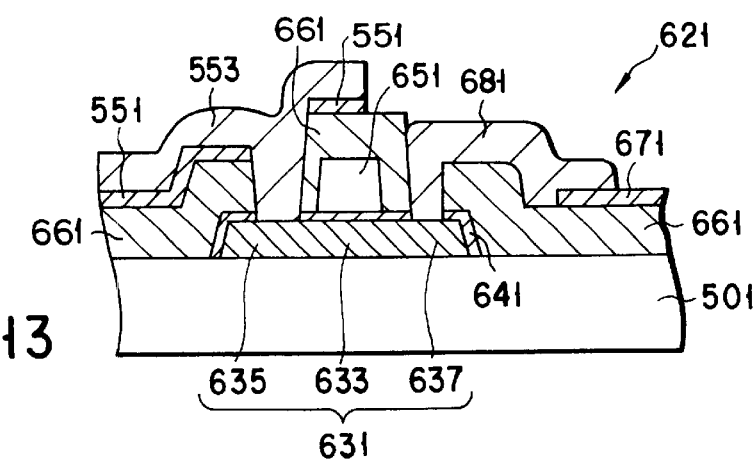
FIG. 13 is a cross-sectional view showing a TFT in a display pixel region shown in FIG. 12.

The TFT 621 comprises, as shown in FIG. 13, a gate electrode 651 arranged above a channel region 633 of a semiconductor film 631 made of polycrystalline silicon (p-Si) thin film with a gate insulating film 641, made of silicon oxide (SiO$_2$), interposed therebetween. The gate electrode 651 is electrically connected to the scanning line $Y_j$. A drain region 635 of the semiconductor film 631 is electrically connected to the signal line $X_i$ via the gate insulating film 641 and an interlayer insulating film 661. The signal line $X_i$ includes a first conductive layer 551 formed simultaneously with the pixel electrode 671 and a second conductive layer 553 formed on the first conductive layer 551. The first conductive layer 551 is formed of ITO, like the pixel electrode 671, whereas the second conductive layer 553 is formed of aluminum. A source region 637 of the semiconductor film 631 is electrically connected via the gate insulating film 641 and the interlayer insulating film 661 to the pixel electrode 671 by a source electrode 681 made of aluminum.

Each signal line $X_i$ is electrically connected to a signal line driving circuit section 521 formed on the transparent insulating substrate 501. Each scanning line $Y_j$ is electrically connected to a scanning line driving circuit section 531 formed on the substrate 501. The signal line driving circuit section 521 and the scanning line driving circuit section 531 are formed simultaneously with the display pixel region 511.

The array substrate 500 for a display device of this embodiment is formed through a film forming steps, a photoresist applying steps and a drying steps, and thereafter, as shown in FIG. 12, repeated exposure and patterning steps for four segment regions.

Each of the signal line driving circuit section 521 and the scanning line driving circuit section 531 includes a plurality of electrode wires. In a double exposure region in each of the electrode wires, a wire may be narrower or wire breakage may occur.

Figure 14:
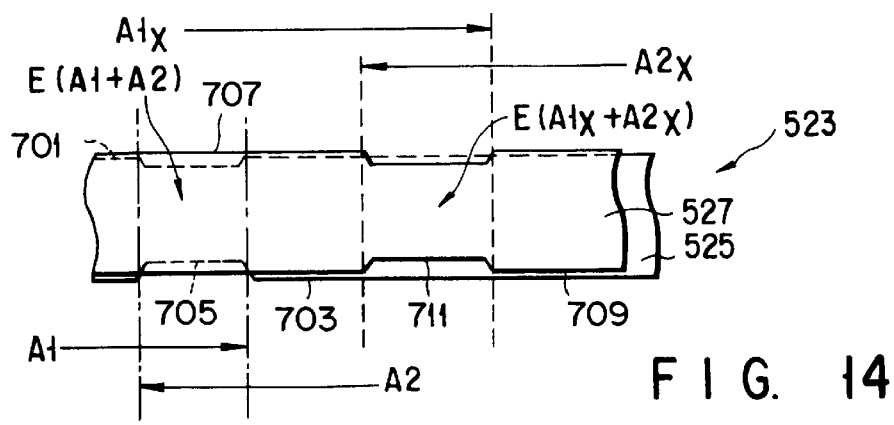
FIG. 14 is a plan view showing an electrode wire in a signal line driving circuit section shown in FIG. 12.

To solve the above problem, the electrode wire of this embodiment has a structure as shown in FIG. 14. In the following, the electrode wire in the signal line driving circuit section 521 is described as an example. The electrode wires in the other sections, such as the scanning line driving circuit section 531, also have the same structure.

As shown in FIG. 14, an electrode conductive layer 523 comprises a first conductive layer 525 made of ITO and having a wire width of 5 $\mu$m having a first wiring pattern 701 and a second wiring pattern 703 separated by a narrowed wiring region defining a boundary region 705 and a second conductive layer 527 formed of aluminum and having the same wire width as that of the first conductive layer 525 having a third wiring pattern 707 and a fourth wiring pattern 709 separated by a narrowed wiring region defining another boundary region 711. The first wire layer 525 is formed simultaneously with the pixel electrode 671 in the display pixel region 511. Although the first conductive layer 525 and the second conductive layer 527 have the same wire width in this embodiment, it is possible that, for example, the first conductive layer 525 has a wire width of 3 $\mu$m and the second conductive layer 527, of a wire width of 5 $\mu$m, covers the first conductive layer 525.

The first and second conductive layers 525 and 527 are divided into a plurality of segment regions, which are individually patterned. At this time, a region E (A1+A2) corresponding to the double exposure region A1+A2 of the first conductive layer 525 and a region E (A1x+A2x) corresponding to the double exposure region A1x+A2x of the second conductive layer 527 are formed on different regions on the same plane.

As described above, the electrode wire layer 523 is constituted by at least two conductive layers 525 and 527 and electrically connected to each other. In addition, the double exposure regions of the two conductive layers, for example, A1+A2 and A1x+A2x, are formed in different regions on the same plane. For this reason, even if wiring defect, such as wire breakage, occurs in one of the conductive layers, the other conductive layer functions redundantly. The electrode wire layer itself therefore will not be cut.

It is preferable, like the display pixel region 511, that the double exposure regions A1+A2 and A1x+A2x be arranged so as not to overlap the circuit elements, such as TFTs, constituting the driving circuit sections 521 and 531. This is because the TFTs in the double exposure regions may have a channel length and a channel width different from those of the TFTs in the other regions, resulting in the possibility of the operation characteristic being degraded.

Although not described above, the display pixel region 511 can be formed in the same manner as that in the aforementioned embodiment.

Figure 15:
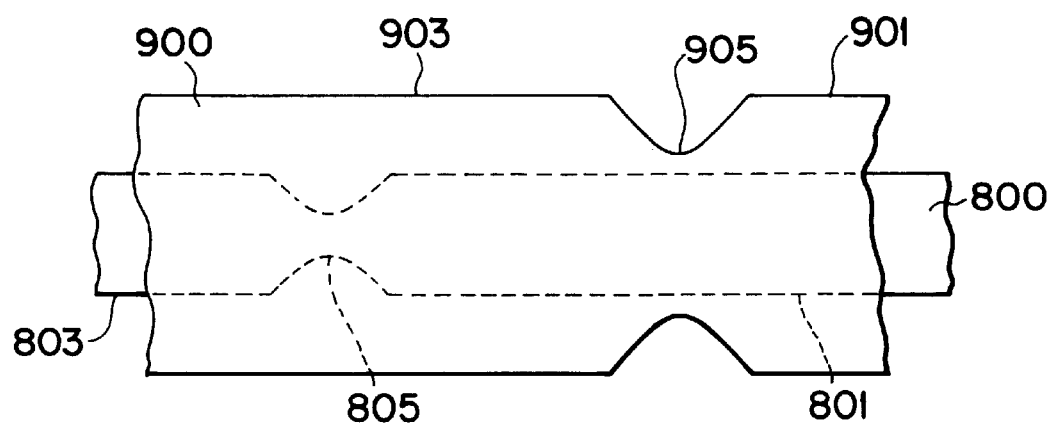
FIG. 15 is a plan view showing, in enlarged detail, the narrowed wiring region as shown in FIG. 1C, which defines a boundary region of the first and second conductive layers, and the arrangement of the first and second conductive layers shown in FIG. 7, FIG. 8 and FIG. 10.

As shown in FIG. 15, the first conductive layer 800, has a first wiring pattern 801 and a second wiring pattern 803, separated by a narrowed wiring region defining a boundary region 805. The first conductive layer 800 is in electrical contact with a second conductive layer 900. The second conductive layer 900 has a third wiring pattern 901 and a fourth wiring pattern 903, separated by a narrowed wiring region defining another boundary region 905. As also shown in FIG. 15, the fourth wiring pattern 903 is located on the boundary region 805 between the first wiring pattern 801 and the second wiring pattern 803. The first wiring pattern 801 is located under the boundary region 905 between the third wiring pattern 901 and the fourth wiring pattern 903.

The electrode wire is not limited to the material used in this embodiment but can be any material which can be used as an electrode.

In the above embodiments, TFTs having amorphous silicon (a-Si:H) thin film or polycrystalline silicon (p-Si) thin film as a semiconductor layer are used as switching elements. However, single crystal silicon or microcrystal silicon can be used as a semiconductor layer, instead of amorphous silicon (a-Si:H).

The array substrate for the display device using TFTs as the switching elements and the active matrix liquid crystal display incorporating the substrate are described above as the embodiment. However, for example, two-terminal nonlinear elements (e.g., MIMs), instead of the TFTs, can be used as the switching elements.

Further, if polymer dispersion type liquid crystal is used as the liquid crystal composition, the alignment film and the polarization plate are unnecessary.

Furthermore, the transmission type liquid crystal display device has been described above as an example. However, to use a reflection type liquid crystal display device, it is only necessary that the pixel electrodes be formed of a high-reflection material, such as aluminum (Al), in place of ITO film, or a reflection plate be adhered to the rear surface of the array substrate.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for manufacturing an electrode substrate including a conductive line which comprises a first conductive line and a second conductive line stacked on said first conductive line, comprising:

providing an insulating substrate;

forming a first conductive layer by patterning a first conductive layer on said insulating substrate, wherein said first conductive layer has first and second wiring portions and a first boundary portion located between said first and second wiring portions, said first wiring portion being patterned with a first mask, said second wiring portion being patterned with a second mask, and said first boundary portion being patterned with said first and second masks; and forming a second conductive layer by patterning a second conductive layer, wherein said second conductive layer has third and fourth wiring portions and a second boundary portion located between said third and fourth wiring portions, said third wiring portion being patterned with a third mask, said fourth wiring portion being patterned with a fourth mask, and said second boundary portion being patterned with said third and fourth masks, wherein said first boundary portion of said first conductive line and said second boundary portion of said second conductive line do not overlap each other.

2. The method of claim 1 further comprising:

depositing a third conductive layer; and patterning said third conductive layer to form a plurality of pixel electrodes along with said conductive line, said plurality of pixel electrodes forming a display pixel region.

3. The method of claim 1, wherein said first conductive layer is formed of indium tin oxide.

4. A method of manufacturing a signal line for an electrode substrate, said signal line including a first conductive line and a second conductive line stacked on said first conductive line, said method comprising:

forming a first conductive layer and pixel electrodes along with said first conductive line by patterning a first conductive layer on said electrode substrate, wherein said first conductive layer has first and second wiring portions and a first boundary portion located between said first and second wiring portions, said first wiring portion and at least one of said pixel electrodes are patterned with a first mask, said second wiring portion and others of said pixel electrodes are patterned with a second mask, and said first boundary portion is patterned with said first and second masks; and forming a second conductive layer by patterning a second conductive layer, wherein said second conductive layer has third and fourth wiring portions and a second boundary portion located between said third and fourth wiring portions, said third wiring portion being patterned with a third mask, said fourth wiring portion being patterned with a fourth mask, and said second boundary portion being patterned with said third and fourth masks, wherein said first boundary portion of said first conductive line and said second boundary portion of said second conductive line do not overlap each other.

5. A method of manufacturing an electrode substrate, comprising:

providing an insulating substrate;

depositing a first conductive film on said insulating substrate;

applying a first photoresist to said deposited first conductive film;

exposing a first area of said applied first photoresist using a first mask pattern;

exposing a second area of said applied first photoresist using a second mask pattern, wherein a part of said exposed second area of said applied first photoresist overlaps a part of said exposed first area of said applied first photoresist;

developing said exposed first photoresist to form a first resist pattern;

patterning said first conductive film in accordance with said first resist pattern to form a first conductive layer including a first wiring pattern corresponding to the first mask pattern, a second wiring pattern corresponding to the second mask pattern, and a first boundary region corresponding to an overlap portion of the first and second mask patterns;

depositing a second conductive film on said insulting substrate and said first conductive layer;

applying a second photoresist to said deposited second conductive film;

exposing a third area of said applied second photoresist using a third mask pattern;

exposing a fourth area of said applied second photoresist using a fourth mask pattern, wherein a part of the exposed third area of said applied second photoresist overlaps a part of said exposed fourth area of said applied second photoresist;

developing said exposed second photoresist to form a second resist pattern;

patterning said second conductive film with said second resist pattern to form a second conductive layer stacked on said first conductive layer, the second conductive layer including a third wiring pattern corresponding to the third mask pattern, a fourth wiring pattern corresponding to the fourth mask pattern, and a second boundary region corresponding to an overlap portion of the third and fourth mask patterns, wherein said first boundary region of said first conductive layer and said second boundary region of said second conductive layer do not overlap each other.

6. The method of claim 5, wherein said first and second conductive layers form a scanning line.

7. The method of claim 5, further comprising forming a channel protecting film aligned with said scanning line by using said scanning line as a mask pattern.

8. The method of claim 5, wherein said first and second conductive layers form a storage capacitor line.

9. The method of claim 5, wherein said first and second conductive layers form a signal line.

10. The method of claim 5, further comprising:

depositing a third conductive film; and patterning said third conductive film to form a plurality of pixel electrodes along with said first and second conductive layers.

11. The method of claim 10, wherein said pixel electrodes are formed of indium tin oxide.

12. The method of claim 10, wherein said plurality of pixel electrodes form a display pixel region.

13. The method of claim 5, wherein said first conductive layer is formed of indium tin oxide.

14. The method of claim 5, wherein a length of the overlap portion between the first and second mask patterns and a length of the overlap portion between the third and fourth mask patterns are greater than 0 $\mu$m and less than or equal to 10 $\mu$m.

15. A method for manufacturing an electrode substrate having a plurality of conductive lines, comprising:

providing an insulating substrate;

depositing a first conductive film on said insulating substrate;

applying a first photoresist to said deposited first conductive film;

exposing a first area of said applied first photoresist using a first mask pattern;

exposing a second area of said applied first photoresist using a second mask pattern, wherein a part of said exposed second area of said applied first photoresist overlaps a part of said exposed first area of said applied first photoresist;

developing said exposed first photoresist to form a first resist pattern;

patterning said first conductive film with said first resist pattern to form first conductive lines, each of which includes a first wiring pattern corresponding to the first mask pattern, a second wiring pattern corresponding to the second mask pattern, and a first boundary region corresponding to an overlap portion of the first and second mask patterns;

depositing a second conductive film on said insulating substrate and said first conductive layer;

applying a second photoresist to said deposited second conductive film;

exposing a third area of said applied second photoresist using a third mask pattern;

exposing a fourth area of said applied second photoresist using a fourth mask pattern, wherein a part of said exposed third area of said applied second photoresist overlaps a part of said exposed fourth area of said applied second photoresist;

developing said exposed second photoresist to form a second resist pattern; and patterning said second conductive film with said second resist pattern to form second conductive lines which are stacked on said first conductive lines, respectively, each of the second conductive lines including a third wiring pattern corresponding to the third mask pattern, a fourth wiring pattern corresponding to the fourth mask pattern, and a second boundary region corresponding to an overlap portion of the third and fourth mask patterns, wherein said first boundary region of said first conductive line and said second boundary region of said second conductive line do not overlap each other.

16. The method according to claim 5, wherein said patterning said first conductive film and said patterning said second conductive film include etching of the first or second conductive film and removing the first or second resist mask, respectively.

17. The method according to claim 5, further comprising arranging a plurality of pixel electrodes on said insulating substrate along with said conductive lines.

18. The method according to claim 5, further comprising arranging switching elements along with said conductive lines.

19. The method according to claim 18, wherein the switching element is a thin-film transistor.

20. The method according to claim 19, wherein the thin-film transistor includes a semiconductor film, an ohmic contact layer, and source and drain electrodes.

21. The method according to claim 15, wherein a plurality of pixel electrodes are disposed along with said conductive lines to form a pixel display region.

22. The method according to claim 21, wherein said plurality of pixel electrodes are formed at the same time as least one of said first and second conductive lines.

23. The method according to claim 22, wherein said plurality of pixel electrodes are made of indium tin oxide.

24. The method according to claim 15, wherein the first conductive layer is covered by the second conductive layer.

* * * * *

UNITED STATES PATENT AND TRADEMARK OFFICE
CERTIFICATE OF CORRECTION

PATENT NO.   : 6,411,350 B2  
DATED        : June 25, 2002  
INVENTOR(S)  : Ejiri et al.

Page 1 of 1

It is certified that error appears in the above-identified patent and that said Letters Patent is hereby corrected as shown below:

<u>Title page,</u>
Item [30], should read:
-- [30]         Foreign Application Priority Data
    Nov. 24, 1994 (JP)        6-289324
    Sep. 28, 1995 (JP)        7-250275 --

Item [56], References Cited, U.S. PATENT DOCUMENTS, insert:
--    5,042,918    08/1991    Suzuki              359/59
      5,162,933    10/1992    Kakuka et al.       359/59
      5,811,866    09/1998    Hirata              257/435
      5,349,205    09/1994    Kobyashi et al.     257/59
      5,502,583    03/1996    Sukegawa et al.,    359/59
      5,517,342    05/1996    Kim et al.          359/59
      5,777,703    07/1998    Nishikawa           349/47
      5,818,549    10/1998    Maruyama et al.     349/42 --

Item [57], ABSTRACT, should read:

The present invention provides a method of manufacturing an electrode substrate. An insulating substrate is provided, on which a first conductive layer is formed. The first conductive layer has a narrowed wiring region and forms a first wiring pattern and a second wiring pattern. The narrowed wiring region defines a boundary region disposed between and separating the first wiring pattern and the second wiring pattern. A second conductive layer is formed in electrical contact with the first conductive layer. The second conductive layer has a narrowed wiring region and forms a third wiring pattern and a fourth wiring pattern. The narrowed wiring region defines another boundary region disposed between and separating the third wiring pattern and the second wiring pattern. The first and second conductive layers are formed such that the boundary regions of each of the first and second conductive layers do not overlap each other.

Signed and Sealed this

Twenty-ninth Day of April, 2003

JAMES E. ROGAN
*Director of the United States Patent and Trademark Office*